Jan. 9, 1940. M. TIBBETTS 2,186,505
MOTOR VEHICLE
Filed Oct. 10, 1935 3 Sheets-Sheet 2
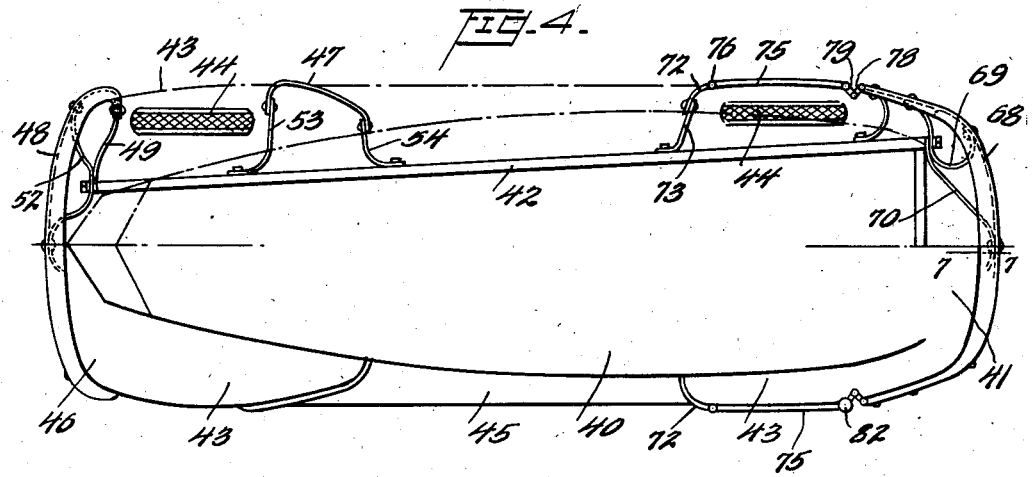
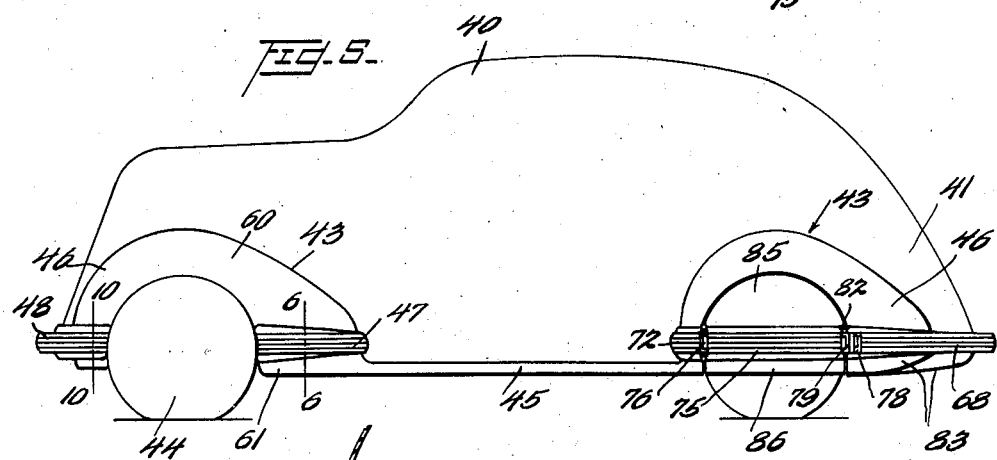
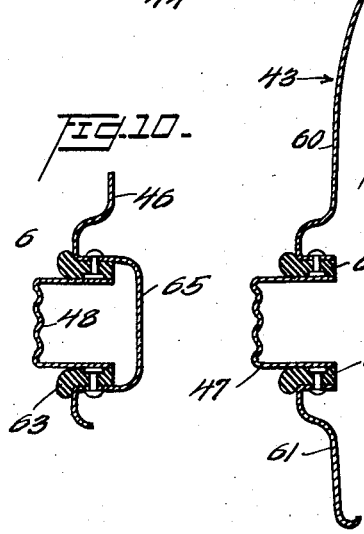
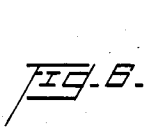
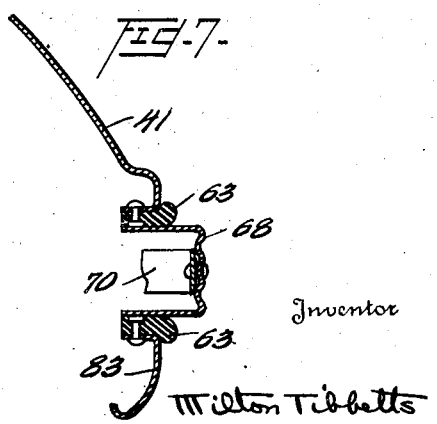

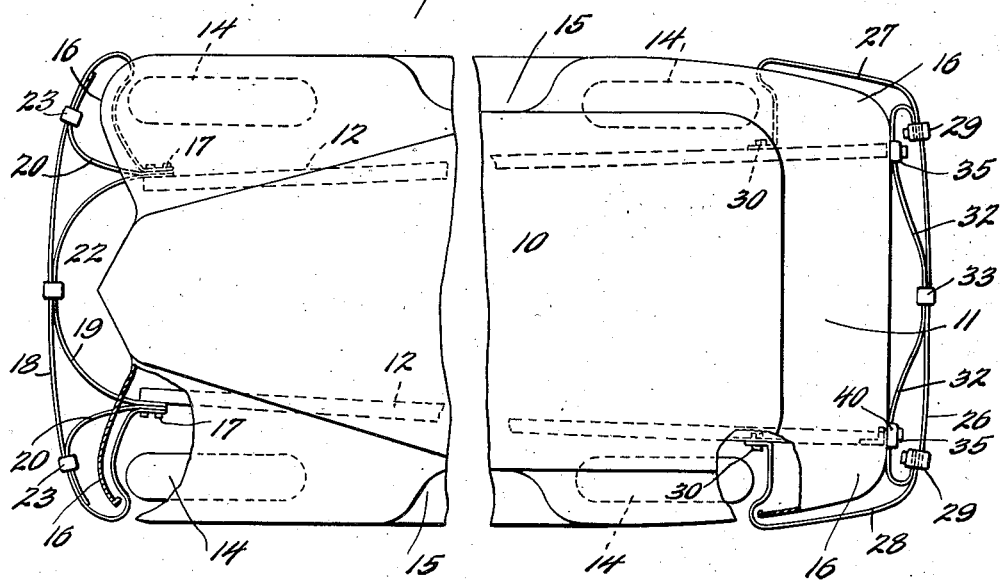

Jan. 9, 1940.                M. TIBBETTS                2,186,505
                            MOTOR VEHICLE
                       Filed Oct. 10, 1935            3 Sheets-Sheet 3
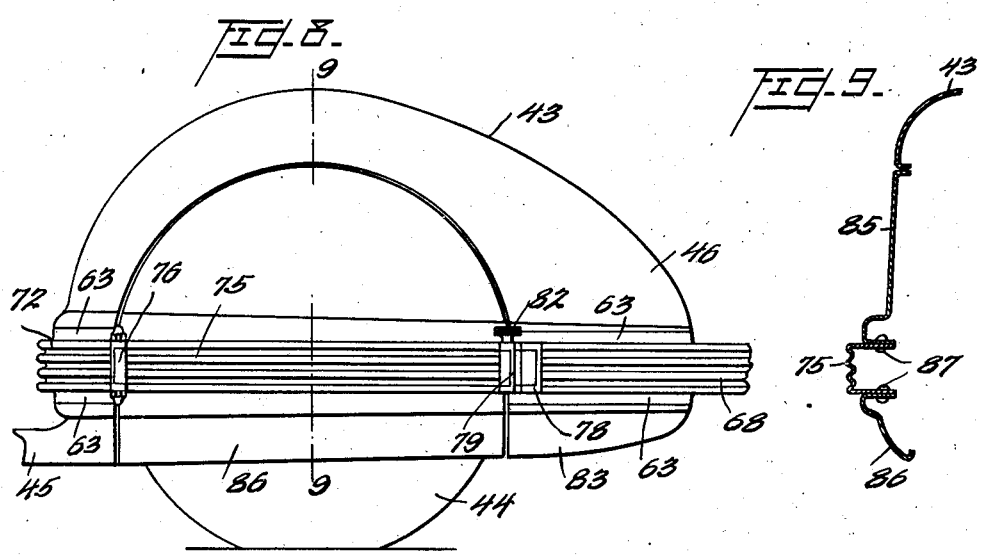
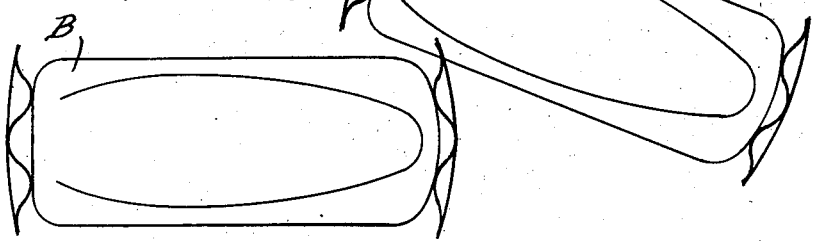
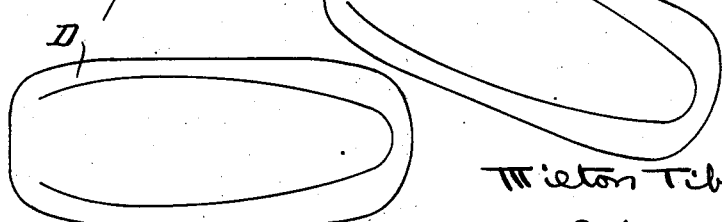
Inventor
Milton Tibbetts
By Watson, Coit, Morse & Prindle
Attorney Patented Jan. 9, 1940

2,186,505

UNITED STATES PATENT OFFICE 2,186,505

MOTOR VEHICLE

Milton Tibbetts, Detroit, Mich., assignor to Packard Motor Car Company, Detroit, Mich., a corporation of Michigan Application October 10, 1935, Serial No. 44,460

16 Claims. (Cl. 293—55)

This invention relates to motor vehicle structure and is more particularly concerned with an improved form of bumper construction affording increased protection to the sheet metal panels and fenders of the vehicle and preventing the locking of the bumpers of two vehicles.

The bumpers commonly applied to motor vehicles extend either partly or wholly across one or both ends of the vehicle and are usually supported on the side members of the frame structure so that the lateral ends of the bumpers are free. A fair degree of protection is thus afforded the body structure at the ends of the vehicle, but there is little or no protection for the fenders. As a result, the principal damage to vehicles on occurrence of a minor collision is the bending or crumpling of the fenders which are usually struck at their sides with a glancing blow. Furthermore, conventional bumper construction is such that the free ends of bumpers on two cars frequently become interlocked, either as the result of improper maneuvering while the vehicles are in motion or as one vehicle is moved into or out of a parking space adjacent another vehicle, this locking of the bumpers being not only a source of frequent annoyance but occasionally causing serious accidents.

It is proposed as a feature of the present invention that the bumper at either end of the vehicle shall have the free ends thereof extended so as to lie laterally of the fenders in a direction generally longitudinal of the vehicle, the sides of the fenders being thereby protected from glancing blows. As a further feature of the invention it is proposed to extend the ends of the bumpers still further so that the bumpers may encompass the end portions of the fenders and to secure the bumper ends to the frame. Obviously a bumper constructed in this manner has no free end which may interlock with the bumper on another vehicle and affords maximum protection from damage to the fenders. The structure is furthermore much more sturdy than that of the conventional bumper, this being of particular importance since it is usually desired that a bumper be constructed so as to flex to some extent on meeting of the structure to absorb the shock of impact.

More specifically, it is an object of the invention to provide a bumper which is connected intermediate its ends to the adjacent ends of the side frame members of the vehicle, the ends of the bumper being deflected about the depending end portions of the adjacent fenders, extending between these portions of the fenders and the associated road wheels or about the road wheels, and secured at its extreme ends to the side frame members so as to encompass the end portions of the fenders. If it is desired that the bumper shall extend about the road wheels, provision is preferably made for the ready removal of the wheels for tire replacement, that portion of the bumper adjacent the wheels being displaceable to afford access to the wheels.

As a further feature of the invention it is proposed to closely associate the bumper and fenders to provide in effect a built-in bumper construction, the bumper being supported independently of the fenders but lying substantially in or in close proximity to the plane of the fenders. Thus it is possible by proper design of the fenders to obtain even more clearance between maneuvering vehicles than with conventional bumper and fender structure and at the same time to afford complete protection for the fenders and avoid fender interlocking.

Further objects and features of the invention will be apparent from the following description taken in connection with the accompanying drawings, in which Figure 1 is a plan view of a motor vehicle to which bumpers constructed in accordance with the principles of the present invention are applied;

Figure 2 is a side elevation of the vehicle shown in Figure 1;

Figure 3 is a fragmentary horizontal, sectional view of one of the connections between the bumper and the frame shown in Figure 1;

Figure 4 is a plan view of a motor vehicle, partly in section, corresponding to Figure 1 and illustrating a modified form of the invention;

Figure 5 is a side elevation of the vehicle shown in Figure 4;

Figure 6 is a sectional view taken on the line 6—6 of Figure 5;

Figure 7 is a sectional view taken on the line 7—7 of Figure 4;

Figure 8 is an enlarged side elevation of a portion of the structure shown in Figure 5;

Figure 9 is a section taken substantially on the line 9—9 of Figure 8;

Figure 10 is a section on the line 10—10 of Figure 5; and

Figures 11 and 12 are diagrammatic views illustrating the advantages of the present construction in maneuvering motor vehicles.

To facilitate an understanding of the invention, reference is made to the embodiment thereof illustrated in the accompanying drawings and specific language is employed. It will nevertheless be understood that no limitation of the scope of the invention is thereby intended but that various alterations and modifications of the illustrated structure are permissible.

In the form of the invention shown in Figure 1 of the drawings, the body of the vehicle is illustrated in outline as comprising the enclosed portion 10 of the body, the panel structure of the latter being formed in the conventional way and including a downwardly extending panel or apron 11 at the rear, the latter being streamlined in accordance with the usual practice. The body is supported on a conventional frame structure of which the side frame members or rails 12 are shown, these rails extending to the extreme forward and rear ends of the vehicle. A fender structure overlying the road wheels 14 and extending along the length of the vehicle at each side thereof is provided, this fender structure being suitably carried on the vehicle body or frame and affording the usual running boards 15. The fenders are each provided with depending end portions 16 which lie adjacent the road wheels and immediately beyond the same, as measured longitudinally of the vehicle.

Referring now to the bumper structure which is associated with the forward end of the vehicle, it will be observed that this comprises a main bumper element 18 which extends across the front end of the vehicle, is deflected about the front ends 16 of the adjacent fender structures and is secured as indicated at 17 to the side rails of the vehicle frame, this bumper element passing between the end portions 16 of the fenders and the adjacent road wheels 14. Reinforcing elements 19 and 20 are also provided, these elements being secured to the principal bumper element 18 at 22 and 23 respectively and being secured to the side rails together with the main bumper element 18 at the ends of the rails, as indicated at 17.

It will be appreciated that this construction adequately protects the adjacent fender ends against damage since, in cooperation with the vehicle frame, it completely encompasses these fender ends.

The actual connection of the elements 19 and 20 to the element 18 of the bumper may be effected by means of the usual bumper guards, these guards being shown more clearly in Figure 2 of the drawings.

At the rear end of the vehicle the construction is generally similar, although the principal bumper element is preferably formed of three separate members 26, 27, and 28, these members being secured together as indicated at 29, for instance by the employment of bumper guards, the members 27 and 28 extending laterally of the adjacent rear end portions 16 of the fenders, being directed inwardly between the fender end portions and the associated road wheels 14, and being secured to the side frame members at points 30 which are substantially spaced from the rear ends of the side frame members. A reinforcing element 32 may be secured to the member 26 at the central portion of the latter, for instance by means of a bumper guard 33, the element 32 being further secured as indicated at 35 to the rear ends of the side frame members 12 and extending outwardly for connection to the principal element of the bumper at the points 29.

With this construction as with the arrangement provided at the forward end of the vehicle, adequate protection is afforded for the fender ends and there is no possibility of locking with the bumpers of other vehicles. Figure 3 illustrates more particularly the mode of attachment of the element 32 to the ends of the side frame members. Thus the depending rear panel 11 is apertured to receive a bolt 38, the bolt also passing through an angular element 39 which is secured, for instance by welding, to the adjacent side rail 12. The bolt 38 also passes through the member 32 and an element 40, the latter serving to securely clamp the element 32 and the depending panel 11 to the frame, thus lending increased rigidity to the panel.

In describing the structure at either end of the vehicle as a bumper, reference is of course made to the entire bumper arrangement, whether this consists of one piece as in the forward construction shown in Figure 1, or of several pieces secured together as in the rear construction shown in the same figure, and regardless of whether the principal bumper element is provided with reinforcing elements or not. The essential feature of the invention is the extension of the bumper laterally of the end portions of the fenders and the securing of the ends of the bumper structure, which are ordinarily free, to the side frame members to afford an encompassing unit.

Referring now to the form of the invention shown in Figures 4 to 9 inclusive, it will be observed that the underlying principle is the same, the bumper being constructed to extend partially or entirely about the end of the adjacent fender so as to afford the necessary protection and to prevent fender locking. Thus the body of the vehicle, of which the enclosed portion is shown in general outline at 40, is formed in the conventional manner to provide a panel structure including a downwardly extending panel or apron 41 at the rear, the apron being of streamlined contour. The body is supported on the usual frame structure including the side frame members or rails 42, the latter being carried by a conventional wheel suspension system on road wheels 44. The fender structure is carried on the vehicle body or frame and includes the fenders 43, the usual running boards 45 being provided. Each of the fenders is formed with a depending end portion 46 which lies adjacent the road wheel and immediately beyond the same, as measured longitudinally of the vehicle.

Referring first to the bumper structure at the forward end of the vehicle, it will be noted that the principal bumper element is illustrated as formed in sections including a main section 48 extending across the forward end of the vehicle and auxiliary sections 47 positioned at either side of the vehicle and rearwardly of the forward road wheels 44. The main section 48 of the bumper may be carried by the frame in a manner generally similar to that described in Figure 1 of the drawings. Thus the ends of this bumper section are extended about the depending end portions 46 of the adjacent fenders and are directed inwardly between the latter and the adjacent road wheels 44. Preferably separate elements 49 are secured to the ends of the adjacent side frame members 42 and to the ends of the bumper section 48 to afford a support for the latter, although it is obvious that the elements 49 may be eliminated and the ends of the bumper section 48 secured directly to the side rails. A reinforcing member 52 is also secured to the forward ends of the side rails 42 and to the bumper section 48 as indicated, this reinforcing member 52 and the supporting element 49 being preferably somewhat flexible so as to permit the bumper to yield on encountering an obstruction.

The auxiliary sections 47 of the forward bumper may be secured to the adjacent side rails 42 by supporting elements 53 and 54, the arrangement being such that the portions of the forward fenders 43 which lie directly to the rear of the road wheels 44 are thereby adequately protected, leaving the road wheels 44 readily accessible for removal and/or tire replacement.

It is desired to avoid any increase in the extreme lateral dimensions of the vehicle as the result of the employment of the bumper structure shown herein and it is therefore proposed to so coordinate the bumper and fender structures that they will be practically coextensive, the bumper projecting beyond the fenders only to an extent sufficient to adequately protect the latter. The desired result is preferably obtained by constructing the fenders so that they are in effect recessed to receive the bumper therein, the bumper being supported for movement with respect to the fenders so that the latter will not be damaged as the result of a collision. For instance, as shown more particularly in Figure 6, the fender structure may be formed in two sections of which the upper panel 60 is carried in any conventional manner on the vehicle body and the lower panel 61 is supported by the running board 45 of which it forms a continuation. Thus a recess or opening is provided in the fender in which is received the bumper section 47, the latter being so positioned that it normally lies in or in close proximity to the plane defined by the associated fender panels. Elements 63 of rubber or other non-metallic material are preferably riveted or otherwise secured to the panels 60 and 61 of each fender for engagement with the bumper 47 so that rattling is prevented, it being appreciated that relative movement of the bumper 47 and the fenders is not in the least interfered with, the bumper being free to flex inwardly in the event of a collision. The main section 48 of the bumper may be similarly received in a recessed portion of the fender and front apron structure. Thus the forward end 46 of the fender 43 may be formed to provide an inwardly directed part 65 affording a recess within which the bumper section 48 may be received, the part 65 being apertured to permit the passage therethrough of the reinforcing member 52. Alternatively, that portion of the lower panel 61 of the fender 43 which is disposed forwardly of the road wheel 44 may be secured directly to the bumper 48 and may move therewith, the inwardly directed part 65 being eliminated.

Referring now to the construction at the rear end of the vehicle, it will be observed that the bumper is similarly formed in several sections of which the main section 68 is supported on the vehicle frame by means of flexible elements 69 and 70. Forward bumper sections 72 may also be provided, these sections being secured to the side frame member by elements 73 or by direct attachment to the frame. Intermediate the bumper sections 68 and 72 the bumper structure is completed by bumper sections 75 which may be hingedly connected to the remainder of the bumper structure, for instance as shown more particularly at 76 in Figure 8 of the drawings. The rearward end of each bumper section 75 may be releasably connected with the adjacent forward end of the main bumper section 68, preferably in such manner as to permit relative movement of the main bumper section and the remainder of the bumper structure. Thus link elements 78 and 79 which are pivoted to each other and to the main bumper section 68 and the displaceable bumper section 75 respectively may be provided, one of the pivotal connections including a hinge pin 82 which is removable. Thus when the pin 82 is withdrawn, bumper section 75 may be displaced outwardly, swinging about the point of hinged connection thereof at 76 to the bumper section 72, and affording access to and permitting removal of the associated road wheel 44 for the purpose of tire replacement. Obviously the hinged support for the bumper section 75 may be located either at the forward or the rearward end thereof.

It will be appreciated that the construction just described affords ample protection against injury to the road wheels as well as to the panel structure, and that the uninterrupted nature of the whole bumper structure ensures against fender interlocking.

In this construction, as in the form of the invention illustrated in connection with the forward portion of the vehicle, it is preferred that the bumper shall not project to an unnecessary extent beyond the fender and for this purpose the fenders and the rear vehicle panel or apron 41 may be in effect recessed to receive the bumper. Thus the depending portions 46 of the fenders and of the intermediate panel or apron 41 and the lower part 83 thereof may be formed as shown more particularly in Figure 7 to receive the main section 68 of the fender, suitable non-metallic strips 63 being interposed between the panel structure and the bumper for engagement with the latter to permit relative movement and to prevent rattling. A similar construction may be provided between the panel structure and the forward sections 72 of the bumper. The lower part 83 of the rear fenders and apron may either be secured to the bumper section 68 or may be formed in the manner suggested in Figure 10 as an integral part of the principal panel structure. Alternatively, the lower part 83 of the fenders and rear apron may be omitted, the bumper being disposed below and constituting in effect a continuation of the panel structure.

Preferably a cover plate is associated with each road wheel, this cover plate being formed to provide an upper portion 85 and a lower portion 86, the two portions of the cover plate being secured as indicated at 87 to the displaceable bumper section 75 so that the whole may be swung outwardly when it is desired to remove the road wheel.

By proper design of the fenders at the opposite ends of the vehicle, the fenders being curved inwardly at the extreme front and rear, the bumpers may be constructed so as to actually occupy less space as measured laterally of the vehicle than with the more conventional bumper construction since the bumper is in effect built into the fender and associated body panels. This is quite apparent from Figures 11 and 12 which illustrate the considerable improvement in maneuvering capacity afforded by the present construction. Thus in Figure 11 the vehicle indicated generally at A is illustrated as passing vehicle B, both vehicles being moving toward the right as viewed in that figure, the vehicle B travelling at a greater rate of speed. It is quite obvious that the rear bumper of vehicle A is likely to interlock with the front bumper of vehicle B, and if the vehicles are travelling at any considerable rate of speed, a serious accident may result, in fact accidents of this character are by no means uncommon and in at least one recent instance such an accident proved fatal to an occupant of one of the vehicles.

It will be observed, however, from Figure 12 that with the vehicles C and D which are provided with bumpers constructed in accordance with the present invention no serious accident is likely to occur as vehicle C overtakes, passes, and cuts in front of vehicle D. Thus even though the relative speeds of the two vehicles are such that a collision is inevitable, there can be no interlocking of the bumpers and after the initial shock of impact the two vehicles can continue on their course without further interference. Figures 11 and 12 of the drawings are likewise illustrations of the difficulties which frequently arise in the parking of one vehicle in close proximity to another. While improper parking may result in a collision between the vehicles, the fenders of the vehicles C and D are amply protected by the bumper structure and no interlocking can occur.

It will be appreciated that in any of the forms of the invention hereinbefore described it is one of the essential features that the vehicle bumper extend about the adjacent lateral portions of the fenders and this or similar descriptive language is employed broadly to cover either an arrangement such as shown in Figures 1 and 2 in which the bumper is located wholly laterally of the fender and is independent thereof or the structure shown in the remaining figures in which the bumper is received within or disposed immediately beneath the fenders. In either construction the bumper extends outwardly beyond the general plane defined by the fender or apron and may be said to pass about the same.

Having thus described the invention, what is claimed as new and desired to be secured by Letters Patent is:

1. In a motor vehicle, the combination with a vehicle frame carrying sheet metal fenders at each side of one end thereof, of a bumper extending uninterruptedly across the end of the frame and across the side of the end portions of the fenders, said bumper being connected to the frame adjacent the end of the latter, and having the ends thereof extended inwardly and attached to the frame so as to encompass the entire end portions of the fenders.

2. In a motor vehicle, the combination with a vehicle frame carrying sheet metal fenders at each side of one end thereof, of a bumper extending across the end of the frame and across the side of the end portions of the fenders, said fenders being formed to provide generally longitudinally extending recesses receiving said bumper at least partially therein, whereby said bumper may lie in close proximity to the plane of each fender.

3. In a motor vehicle, the combination with a vehicle frame carrying sheet metal fenders at each side of one end thereof, of a bumper extending across the end of the frame and across the side of the end portions of the fenders, means supporting said bumper on said frame, said fenders being formed to provide generally longitudinally extending recesses receiving said bumper, and non-metallic means interposed between said bumper and fenders and associated with said recesses.

4. In a motor vehicle, the combination with a vehicle frame, of fenders carried by said frame at each side of the rear end thereof, a body panel extending downwardly and outwardly at the rear of the vehicle and between said fenders, and bumper means disposed in close proximity to the surfaces defined by said panel and fenders and projecting outwardly beyond the panel and the lateral portions of the fenders, said fenders and panel being recessed to provide upper and lower portions for the reception of said bumper therebetween.

5. In a motor vehicle, the combination with a vehicle frame, of fenders carried by said frame at each side of the rear end thereof, a body panel extending downwardly and outwardly at the rear of the vehicle and between said fenders, and bumper means disposed in close proximity to the surfaces defined by said panel and fenders and projecting outwardly beyond the panel and the lateral portions of the fenders, said fenders and panel being recessed to provide upper and lower portions for the reception of said bumper therebetween, the lower portions of said panel and fenders being secured to said bumper.

6. In a motor vehicle, the combination with a vehicle frame having road wheels and carrying sheet metal fenders at each side of the forward end thereof, of a main bumper extending across the forward end of the frame and supported by the latter, and auxiliary bumpers disposed at each side of the frame, each said bumper extending from a point immediately rearward of the road wheel to a point adjacent the rearward end of said respective fender, and being supported by the frame, said auxiliary bumpers cooperating with the main bumper to protect the fenders and road wheels from damage.

7. In a motor vehicle, the combination with a vehicle frame having road wheels and carrying sheet metal fenders at each side of the forward end thereof, of a main bumper extending across the forward end of the frame and supported by the latter, and auxiliary bumpers disposed at each side of the frame immediately rearward of the road wheels and supported by the frame, said auxiliary bumpers cooperating with the main bumper to protect the fenders and road wheels from damage, the rearward portions of said fenders being formed to receive said auxiliary bumpers therein.

8. In a motor vehicle, a frame, a road wheel, a fender covering the road wheel and having an opening therein affording access to the wheel, bumper means on each side of said opening independently supported on the frame for protecting the fender portions on each side of the opening, auxiliary bumper means detachably supported on one of said bumper means, and means supporting said auxiliary means on the other of said bumper means for pivotal movement and for bodily displacement with respect thereto, whereby said auxiliary bumper may be swung away from said opening and whereby the transmission of shock from the one bumper means to the other may be prevented.

9. In a motor vehicle a frame, a road wheel, a fender covering the road wheel and having an opening therein affording access to the wheel, bumper means on each side of said opening independently supported on the frame for protecting the fender portions on each side of the opening, auxiliary bumper means detachably supported on one of said bumper means, and means supporting said auxiliary means on the other of said bumper means for pivotal movement and for bodily displacement with respect thereto, whereby said auxiliary bumper may be swung away from said opening and whereby the transmission of shock from the one bumper means to the other may be prevented, said last named supporting means comprising a double hinge connection.

10. The combination with a motor vehicle having a frame and a fender with a wheel opening therein, of a bumper member pivotally mounted on said frame so as to extend across said opening, and a cover plate for said opening carried by said bumper member.

11. The combination with a vehicle having a wheel at one side and inwardly adjacent one end thereof, said wheel being provided with a fender including an outer flange terminating in an edge defining an opening substantially concentric to the wheel, said flange including a skirt portion between the wheel and the end of the vehicle, of a bumper having a main body portion secured to the end of the vehicle and having an end portion disposed adjacent the side of the vehicle and in protective relation to said skirt portion, said end portion including an inturned portion adjacent the edge of the flange at the skirt portion, and a bracket portion extending inwardly from the inturned portion and being secured to a fixed side member of the vehicle.

12. The combination with a vehicle having a wheel at one side and inwardly adjacent one end thereof, said wheel being provided with a fender including an outer flange terminating in an edge defining an opening substantially concentric to the wheel, said flange including a skirt portion between the wheel and the end of the vehicle, of a bumper having a main body portion secured to the end of the vehicle and having an end portion disposed adjacent the side of the vehicle and in protective relation to said skirt portion, said end portion including an inturned arcuate hook portion embracing the edge of the flange at the skirt portion thereof, and a bracket portion extending inwardly from the hook portion and being secured to a fixed side member of the vehicle.

13. The combination with a vehicle having a wheel at one side and inwardly adjacent one end thereof, said wheel being provided with a fender including an outer flange terminating in an edge defining an opening substantially concentric to the wheel, said flange including a skirt portion between the wheel and the end of the vehicle, of a bumper having a main body portion secured to the end of the vehicle and having an end portion disposed adjacent the side of the vehicle and in protective relation to said skirt portion, said end portion being spaced throughout the length thereof from said skirt portion and including an inturned arcuate hook portion embracing the edge of the flange at the skirt portion thereof, and a bracket portion extending inwardly from the hook portion and being secured to a fixed side member of the vehicle.

14. The combination with a vehicle having a wheel at one side and inwardly spaced from one end thereof, said wheel being provided with a mud-guard including an outer flange terminating in an edge defining an opening substantially concentric to the wheel, said flange including a skirt portion between the wheel and the end of the vehicle, of a main bumper secured to the end of the vehicle and having an end adjacent said skirt portion, and an auxiliary bumper disposed adjacent the side of the vehicle and in protective relation to said skirt portion, said auxiliary bumper being secured at one end to the end of the main bumper and at its opposite end including an inturned arcuate hook portion embracing the edge of the flange at the skirt portion thereof, said hook portion including an inwardly extending bracket secured to a side member of the vehicle.

15. In a motor vehicle, the combination with a vehicle frame carrying sheet metal fenders at each side of one end thereof, the end portions of the lateral surfaces of said fenders lying inwardly of the portions of such surfaces more remote from the vehicle end, of bumper means extending uninterruptedly across the end of the frame and across the end portions of the lateral surfaces of said fenders, said bumper means lying wholly within the outermost confines of the lateral surfaces of said fenders.

16. In a motor vehicle, the combination with a vehicle frame carrying sheet metal fenders at opposite sides of the vehicle rear, said fenders being so shaped that the rear portions of the lateral surfaces of the opposite fenders are spaced to a substantially less extent than forward portions of such lateral surfaces, of bumper means extending across the rear of the frame and across the rear portions of the lateral surfaces of said fenders in laterally spaced relation thereto, said bumper means lying wholly between longitudinally vertical planes defining the lateral limits of the vehicle.

MILTON TIBBETTS.